Figure 32:
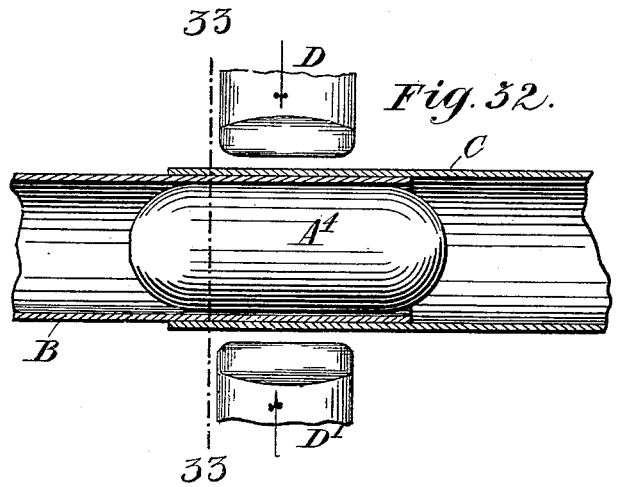

No. 638,554. Patented Dec. 5, 1899.
C. V. BURTON.
METHOD OF AND APPARATUS FOR FORMING TUBULAR JOINTS.
(Application filed Apr. 15, 1898.)
(No Model.) 7 Sheets—Sheet 1.
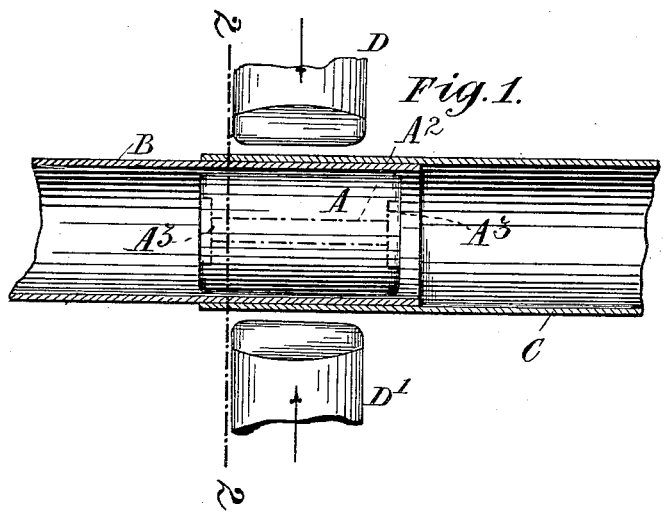
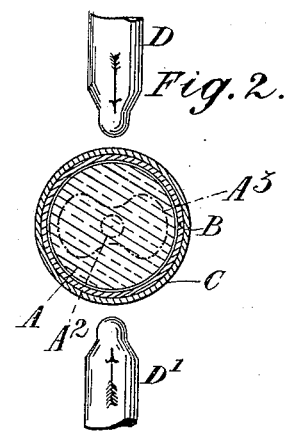
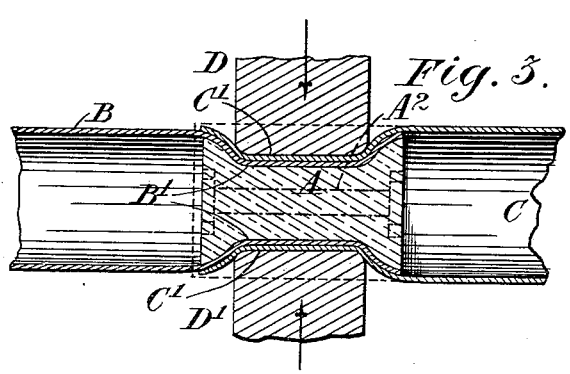
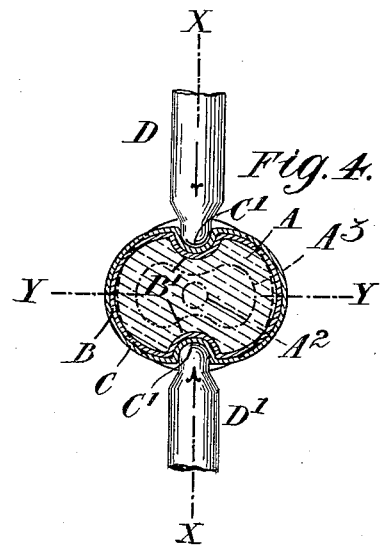
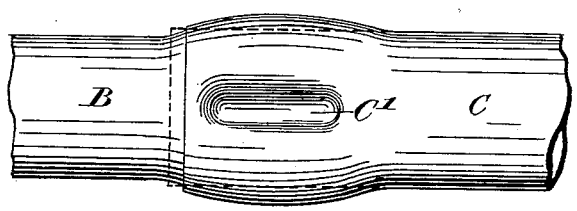
Witnesses:
J. W. Peyton, Jr.
Thomas Durant
Inventor:
Charles V. Burton
by Church & Church
his Attorneys.

No. 638,554. Patented Dec. 5, 1899.
C. V. BURTON.
METHOD OF AND APPARATUS FOR FORMING TUBULAR JOINTS.
(Application filed Apr. 15, 1898.)
(No Model.) 7 Sheets—Sheet 2.
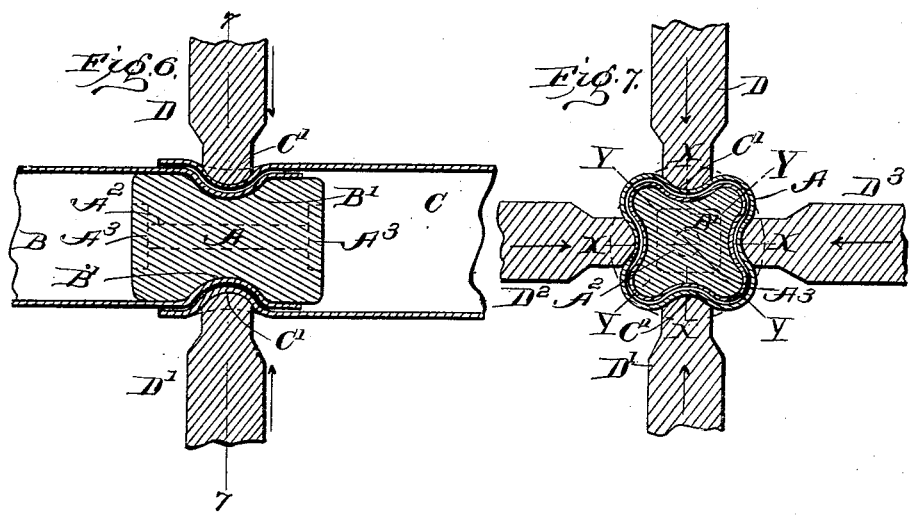
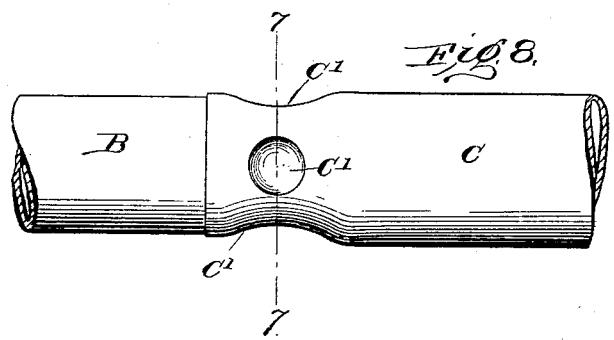

No. 638,554. Patented Dec. 5, 1899.
C. V. BURTON.
METHOD OF AND APPARATUS FOR FORMING TUBULAR JOINTS.
(Application filed Apr. 15, 1898.)
(No Model.) 7 Sheets—Sheet 3.
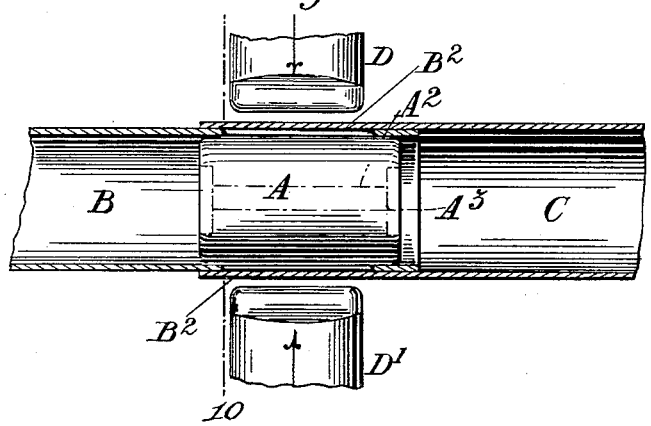
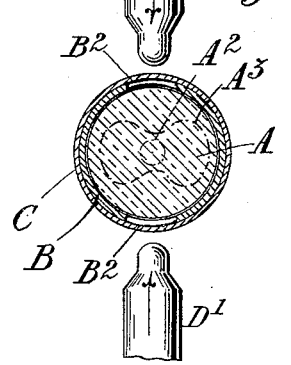
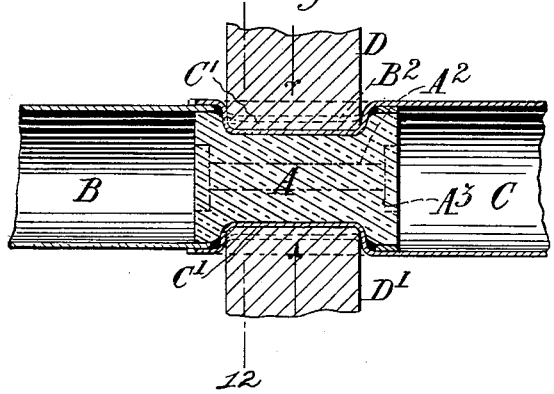
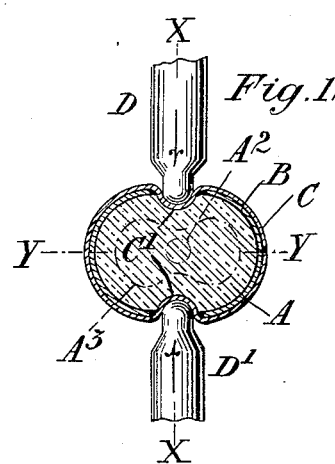
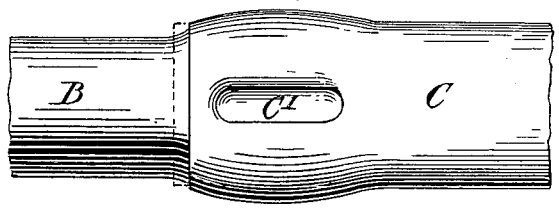

No. 638,554. Patented Dec. 5, 1899.
C. V. BURTON.
METHOD OF AND APPARATUS FOR FORMING TUBULAR JOINTS.
(Application filed Apr. 15, 1898.)
(No Model.) 7 Sheets—Sheet 4.
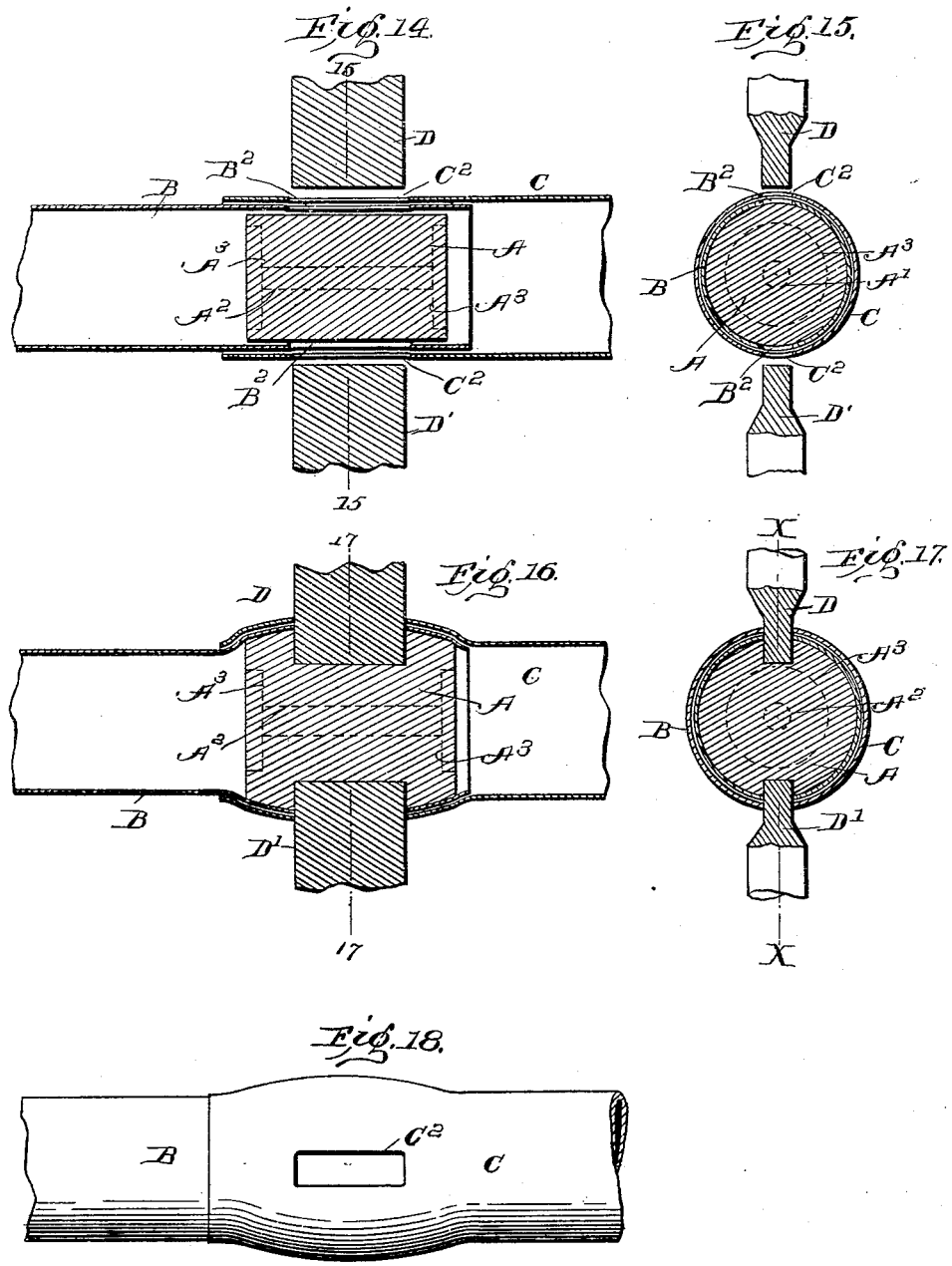

No. 638,554. Patented Dec. 5, 1899.
C. V. BURTON.
METHOD OF AND APPARATUS FOR FORMING TUBULAR JOINTS.
(Application filed Apr. 15, 1898.)
(No Model.) 7 Sheets—Sheet 5.
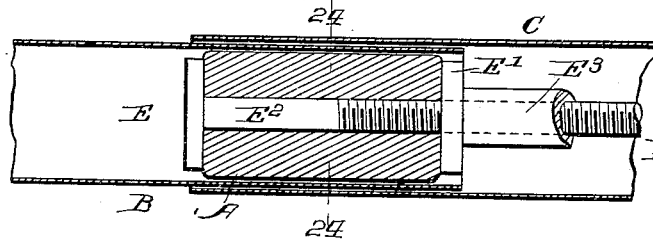
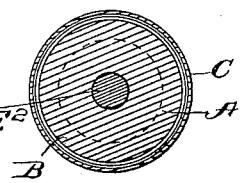
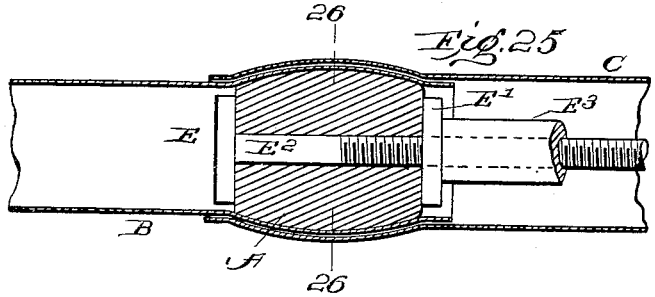
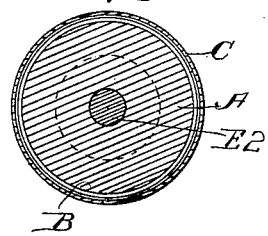
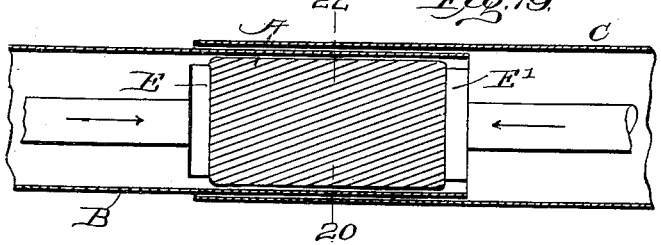
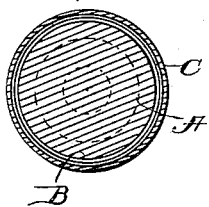
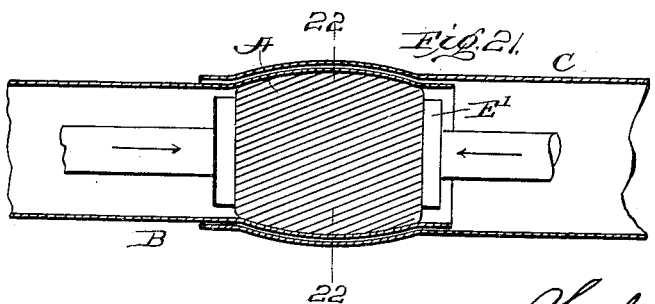
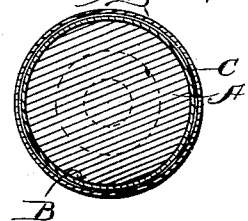

No. 638,554. Patented Dec. 5, 1899.
C. V. BURTON.
METHOD OF AND APPARATUS FOR FORMING TUBULAR JOINTS.
(Application filed Apr. 15, 1898.)
(No Model.) 7 Sheets—Sheet 6.
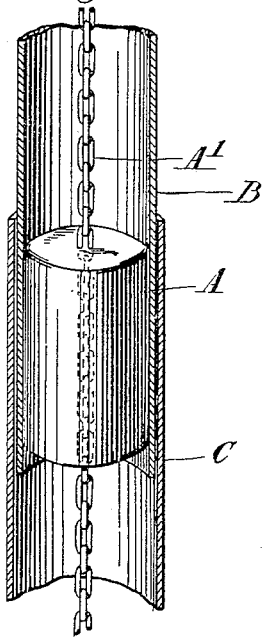
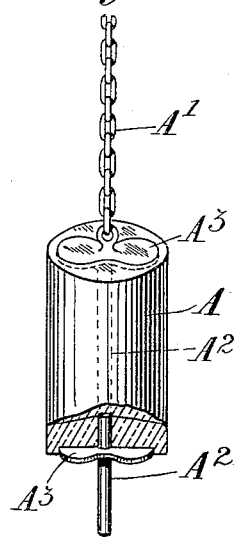
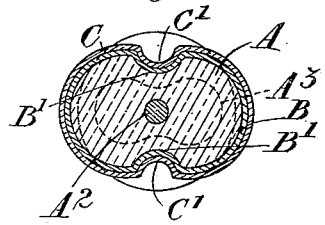

No. 638,554. Patented Dec. 5, 1899.
C. V. BURTON.
METHOD OF AND APPARATUS FOR FORMING TUBULAR JOINTS.
(Application filed Apr. 15, 1898.)
(No Model.) 7 Sheets—Sheet 7.

Witnesses:
J. W. Peyton, Jr.
Thomas Durant.

Inventor
Charles V. Burton,
by Church & Church,
his Attorneys.

UNITED STATES PATENT OFFICE.

CHARLES VANDELEUR BURTON, OF LONDON, ENGLAND.

METHOD OF AND APPARATUS FOR FORMING TUBULAR JOINTS.

SPECIFICATION forming part of Letters Patent No. 638,554, dated December 5, 1899.

Application filed April 15, 1898. Serial No. 677,758. (No model.)

*To all whom it may concern:*

Be it known that I, CHARLES VANDELEUR BURTON, doctor of science, a subject of the Queen of England, residing at 33 Queen's road, Chelsea, London, England, have invented certain new and useful Improvements in Methods of and Apparatus for Forming Tubular Joints, (for which I have made application for Letters Patent in England, No. 5,014, dated March 1, 1898,) of which the following is a specification.

This invention relates to a method and device for use in joining one tube to another tube or hollow article by forcing the parts of the joint into engagement with each other in a novel manner without the use of cement or of brazing or soldering material.

The method and device above referred to may be employed with great advantage in, for example, joining a tube to a tubular lug in a cycle-frame, engaging two tube ends with each other or with a tubular connecting-sleeve, or engaging a liner or bush with the interior of any article in which it is received.

According to this invention a tubular joint is made by placing a plug of deformable material—for instance, a ductile or plastic solid—within a tube which is encircled by the article to which it is to be joined and applying force to the plug to shorten it on one or more of its dimensions. The plug is of such material or is so constrained as to tend to maintain its volume constant, so that such shortening of one or more of its dimensions causes it to expand along other dimensions to deform into engagement with each other the parts of the joint which encircle it.

The material employed for the plug may, if desired, be one which is fusible at a somewhat lower temperature than that at which the parts of the joint would become subject to injury by heat, so that after the plug has served its purpose in the operation of producing the joint, in the course of which it becomes interlocked with the tubular members thereof, it may readily be removed from its place by heating the exterior of the joint, so that the plug fuses and runs out. This fused material can be saved and again made into a plug for further use. There are many kinds of fusible material suitable for use according to this invention. One such material, for instance, is a fusible metal composed of eight parts, by weight, of bismuth, five parts, by weight, of lead, and three parts, by weight, of tin. Another is a mixture of pitch, tallow, and dry plaster-of-paris, similar to the mixture used by art metal-workers as a bed for hammering metal upon. It is not necessary, however, that the deformable plug should also be fusible, for, if desired, it may be allowed to remain in the completed joint. On the other hand, if it is desired that the plug should be removed it may be broken up mechanically or dissolved out by a chemical agent or by water or by other solvent, or it may be charred or otherwise disintegrated sufficiently to permit of its removal. It may comprise a casing harder than its central portion. In this instance the casing could be retained in the completed joint and the central portion removed. Such central portion might be of fusible metal or of a liquid introduced through holes in the harder casing, the holes being afterward plugged, for instance, with fusible metal which would melt upon the application of heat to the joint and allow the fusible or fluid contents of the casing to run out.

Where necessary, any desired means may be employed for restraining the expansion of the deformable plug, either by hindering or by preventing its expansion from occurring otherwise than in the manner desired. Such means may take the form of a tenacious transfixing-piece with terminal enlargements between which the plug is retained or having one or more projections or enlargements for a like purpose intermediate of the ends. Ordinarily the portions of the tubular joint would be circular-cylindrical, and in such cases the plug would be a circular-cylindrical plug approximately fitting the interior of the smaller tubular member of the joint in which it might be cast, the member serving as a mold. Where the parts to be joined are not of circular transverse section, the plug would correspondingly be non-circular in transverse section; but it is to be understood that it is preferred to use the circular-cylindrical form, which has the unique property that any deformation whatever produced by thrusts transverse to the axis of symmetry must result in an increase of periphery provided that the possibility of a diminution of volume is excluded.

To enable the plug to be kept in the desired position within the joint, it may be necessary in certain cases to provide it with devices such as the chain or rod hereinafter described. One of the readiest means of applying force to the plug for the purpose described is to place the tubes for the joint with the plug within them between jaws which are forced together hydraulically or otherwise, so as to produce depressions on the inner and outer tubular portions of the joint, which depressions reduce the diameter of the plug in the line of action of the jaws, expanding it and the tubular portions of the joint transversely to that line of action; or slots can be pro- provided in the inner member of the joint, the jaws being used to produce depressions on the outer tubular member only and force them through the slots into contact with the plug which they deform, as in the previous example, or, if desired, one or both of the two jaws may pass through openings in the tubular portions of the joint, so as to come into actual contact with the sides of the plug in the process of deforming the same.

In the accompanying drawings, Figure 1 is a longitudinal central section of two tube ends ready to be joined according to this invention, the deformable plug being seen in elevation within the inner tube, the tubes being shown between two jaws which are to apply the power by which the operation of jointing is effected. Fig. 2 is a transverse section on the line 2 2 of Fig. 1. Figs. 3 and 4 are views similar, respectively, to Figs. 1 and 2, except that in them the jaws are shown closer together, and the tubes are seen to be deformed by the mutual action of the jaws and plug, so as to become interlocked against any endwise or transverse or rotary movement in relation to each other. Fig. 5 is a plan of the joint shown in section in Figs. 3 and 4. Figs. 6, 7, and 8 are views which are respectively similar to Figs. 3, 4, and 5, save that they show an alternative form of joint produced by four jaws instead of by the two jaws such as are illustrated in Fig. 3. Figs. 9, 10, 11, 12, and 13 are views similar, respectively, to Figs. 1, 2, 3, 4, and 5, but showing an alternative construction of joint produced by depressing the outer tubular member into and through slots in the inner tubular member to act upon the plug within the latter which becomes deformed as in the previous example. Figs. 14, 15, 16, 17, and 18 are views similar, respectively, to Figs. 1, 2, 3, 4 and 5, but showing an alternative construction of joint produced by the application of pressure through holes in the tubes directly to the circumference of the plug, so that the tubes themselves do not, as in the preceding three examples, transmit pressure to the plug. Figs. 19, 20, 21, and 22 are views similar to Figs. 1, 2, 3, and 4 to illustrate the formation of a joint according to this invention by applying pressure to the ends of a cylindrical plug to cause it to expand laterally into barrel form in company with the tubular members which encircle it. Figs. 23, 24, 25, and 26 are similar views in which the plug is barreled by mechanism arranged somewhat differently from that illustrated in the four preceding figures. Fig. 27 is a perspective view showing a plug provided with a chain for holding it in place within the tubular members of the joint and for hindering its longitudinal expansion. Fig. 28 is a similar view, partly in section, showing a plug provided with a rod, as well as a chain, for holding it in place in the tube. Fig. 29 shows in section a plug of the kind illustrated by Fig. 28 in place within a joint of the kind illustrated by Fig. 4. Fig. 30 is a perspective view, partly broken away, of a further construction of plug according to this invention. Fig. 31 shows in longitudinal central section a plug with a casing of harder material, such as is hereinbefore referred to. Figs. 32, 33, 34, 35, and 36 are views which respectively are similar to Figs. 1, 2, 3, 4, and 5, except that they show a construction of joint in which a liner is inserted in the manner hereinafter described.

Like letters indicate like parts throughout the drawings.

In the example illustrated by Figs. 1 and 2 the plug A is placed in the end of the tube B, which extends into the end of another tube C. These tubes are placed between jaws D D'. When these jaws move toward each other in the direction indicated by the arrows in Fig. 2, they deform the contained plug and also the ends of the tubes B C in the manner indicated by Figs. 3 and 4, reducing the diameter of the plug along the line X X of Fig. 4 and causing it to expand along the line Y Y, the perimeter of the cross-section of the plug on the plane of section shown by that figure being increased by reason of the departure from the original form of cross-section, which was circular, the area of cross-section remaining approximately constant in virtue of the contained deformable but nearly incompressible plug. Not only are the ends of the tubes B and C interlocked by this deformation in a manner which prevents them from having any rotary motion in relation to each other, but the increase in the perimeter of the cross-section of the plug A results in a corresponding increase in the perimeter of the inner tube end B encircling it, so that the end of the inner tube B becomes expanded into such very close contact with the interior of the outer tube C that a fluid-tight joint is produced. In addition to the alteration in the cross-section of the joint its form is also altered longitudinally, as indicated in Figs. 3 and 5, in which the original contour of the parts is indicated by dotted lines, the alteration of form produced by the combined action of the plug and the jaws being shown in full lines. The depressions B', Figs. 3 and 4, and C', Figs. 3, 4, and 5, made in the tubes B and C by the jaws D D', serve to aid in locking the jointed tubes against any longitudinal movement in relation to each other in addition to the locking effected by the alteration in the form of the tubes along the longitudinal central plane containing the line Y Y of Fig. 3, which gives the joint some such external form as is indicated by the plan, Fig. 5.

The form of the jaws need not be such as is indicated in the jaws D D' of Figs. 1 and 2, which produce depressions of the kind illustrated in Figs. 3, 4, and 5, for tools of any shape capable of producing a shortening of the diameter of the plug and tubes along the line X X, Fig. 4, may be employed. Moreover, more than two jaws may be used. For example, Figs. 6, 7, and 8 illustrate a joint which has been produced by the combined action of a plug A and four jaws D D' D² D³, which are arranged to approach each other in the directions indicated by the arrows marked upon them. In this example compression of the plug occurs along two lines X X, Fig. 7, and expansion along two lines Y Y.

A further alternative is illustrated in Figs. 9 to 13, in which the inner tube B is provided with holes B², into which the jaws D D' force the indentations C' which they make in the outer tube C. The indentations C' serve not only to lock the tubes B and C together by engaging with the holes in the former, but they act upon the plug A, so that it becomes deformed and expands both the tubes in the manner hereinbefore described with reference to Figs. 1 to 5.

An additional alternative is illustrated by Figs. 14 to 18. In this alternative the plug A only, and not the tubes B C, is compressed along a diametral line X X by means of jaws D D', which are made to pass through coincident holes B² C², Figs. 14 and 15, arranged in both of the tubes B C, so as to act upon the plug by compressing it on one of its dimensions and expanding it along others. In this instance the alteration in the cross-sectional form of the plug differs from that which occurs in the previous examples in that the plug expands radially with more or less uniformity, producing a correspondingly-uniform alteration in the cross-sectional form of the members of the joint, as is indicated by Figs. 16 and 17 of the drawings.

In Figs. 19 to 22 is illustrated the formation of a joint by applying pressure to the ends of a cylindrical plug A by means of rams E E', acting in the direction of the arrows marked upon them to cause the plug to expand laterally into barrel form and to force into similar form the tube ends which encircle it. A similar operation is illustrated by Figs. 23 to 26. In these, however, the rams E E' are carried, respectively, by rods E² E³, the former being, for example, screw-threaded, so that by screw apparatus of any convenient known type the rams can be caused to approach each other to compress the plug A longitudinally and expand it radially in the manner indicated in Fig. 25.

In Fig. 27 a fusible plug A is shown cast upon a tenacious transfixing device consisting of a chain A', by means of which it may be drawn into and retained in proper position in situations in which it would otherwise be liable to accidental displacement. As an alternative the plug may, as in Fig. 28, be cast upon a rod, such as A², which transfixes it between plates A³, which serve to resist expansion of the plug in the line of its axis under pressure. The rod will also retain the plug in the desired position during the formation of the joint, and the plates A³ are of such size and shape that they will not be gripped by the tubes in the formation of the joint, but will be left free for withdrawal subsequent to the melting out of the fusible plug. A plug such as is illustrated by Fig. 28 is shown in the cross-section, Fig. 29, of a completed joint, from which it will be seen that the necessary clearance is left between the plates A³ and the interior of the tube B to enable the metal of the deformed plug A to be run out and the rod A² and plates A³ to be subsequently withdrawn for further use.

Plates A³ of a plug such as is illustrated by Fig. 28 may be attached to a chain A' instead of or in addition to the rod A². In the alternative construction of plug illustrated by Fig. 30 there is a transfixing-piece consisting of a central rod A⁵ with enlarged heads A⁶. The body of the plug A is cast upon this rod, and between each end of that body and the adjacent head A⁶ is a disk A⁷, made up of sectors A⁸, which are put into place about the rod A⁵ before the latter is surrounded by the material of the plug-body, which consequently if cast so as to overlap the circumference of the disk A⁷ in the manner indicated at the upper end of Fig. 30 will retain the sectors A⁸ in company on the rod A⁵ to constitute a complete disk serving to check any endwise expansion of the plug until the plug-body is melted. In the melting of the plug-body after the plug has been used in the formation of a joint in the manner previously described the sectors A⁸ fall apart from each other and from the rod A⁵, so that the sectors and rod can be readily shaken out or otherwise removed from the joint, for their dimensions are such that individually they will freely pass through the portions of the tubular parts notwithstanding that such portions are reduced in width during the jointing operation.

Instead of plates A³ or disks A⁶ A⁷ at the ends of the transfixing-piece enlargements of any desired form—for instance, the enlargements A¹¹, Fig. 30—can be provided intermediate of the ends of the tenacious transfixing-piece A⁵ to restrain the flow of the material of the plug which tends to occur in the direction of the length of the latter.

In each pair of plates A³ or disks A⁷, such as are hereinbefore referred to, only one of the two need in general have its dimensions or those of its parts reduced sufficiently to enable it to pass through the reduced portions of the joint, provided that in the withdrawal of the plates or disks the other one not so reduced is withdrawn away from instead of through the joint.

Figure 33:
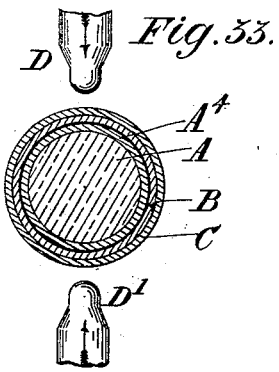
Figure 34:
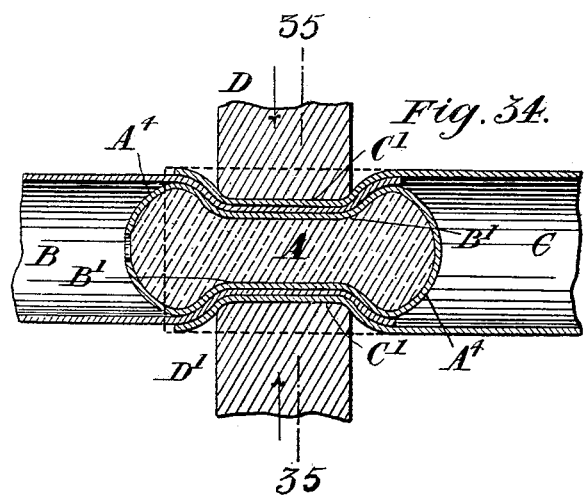
Figure 35:
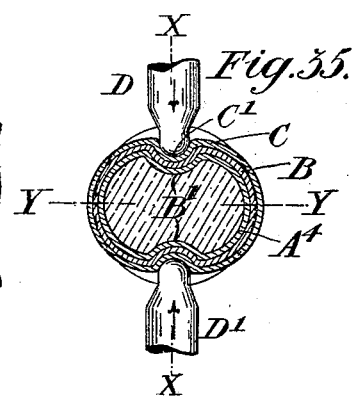
Figure 36:

Fig. 31 illustrates a plug with a casing A⁴ of harder material, which casing when the plug is employed in the manner indicated in Figs. 32 and 33 will be deformed like the tubes B and C, as shown in Figs. 34 and 35, and is intended to be left inside the joint as a strengthening-liner. This cased plug may be provided with a chain A', Fig. 31, passing through a small opening in the casing, or with a rod A², or with both, as indicated by dotted lines in that figure. The casing may have both of its ends entirely closed like the upper end of the cased plug shown by Fig. 31 if it is not desired that the ductile material should be subsequently removed by fusion; but if the ductile material is to be melted out one or both ends of the casing A⁴ should be open like the lower end thereof, as illustrated in Fig. 31. The plug may consist of a capsule or casing, such as A⁴, Fig. 31, with both its ends closed, containing instead of fusible metal a liquid which can be delivered into it through a hole or holes closed by a fusible stud A¹². This stud will melt and allow the liquid to evaporate if heat be applied to the joint for the purpose after the plug thus constituted has served its object. If the plug be so placed in the joint that the stud A¹² comes at its lower end, the liquid will flow out as soon as the stud melts.

Plates, such as A³, Fig. 28, may be applied to resist longitudinal expansion of the plug, together with a transfixing device A² to connect them, as indicated by chain-lines in Figs. 1, 2, 3, 4, 5, 7, 9, 10, 11, 12, 14, 15, 16, and 17, without necessarily extending that device A² beyond either end of the plug.

Although the indentations B' C', hereinbefore referred to by way of example, extend longitudinally along the joint, it is clearly to be understood that the number and form of the indentations employed may be varied as desired as long as they operate to reduce the dimensions of one or more portions of a deformable plug in such a manner as to effect an increase in the dimensions of some other portions of that plug for expanding the portions of a tubular joint into engagement with each other in the manner described. Such indentations suitably disposed may not only be utilized in producing the joint, but may serve also as ornamentation for the parts jointed. For instance, in a cycle the indentations may be given the form of the maker's initials, monogram, or trade-mark.

In the foregoing description it has been assumed that a single tube B is expanded into one end of another tube C; but the tube C might be a sleeve with two tubes, such as B, expanded into its opposite ends. In such case a single plug A about double the length of the joint portions of either tube B could be used, with two sets of jaws D D', one set for each tube B, or a pair of tube ends might abut against each other at the middle of the length of the plug A, Fig. 1, to be expanded into the encircling tube C by a single plug A and single set of jaws D D', arranged and operating in the manner hereinbefore described, each jaw making one half of a depression in one tube B and the other half depression in line with it in the companion tube B.

The plug employed for the purposes of the present invention is a plug which is deformable not by reason of the hinging or flexibility of constituent plates or rods or by the articulation or hinging of the parts of the plug structure or by the addition of material to cause an increase in the volume of the plug, but it is deformable by reason of its body or some portion thereof being made of a material susceptible of shearing deformation.

I claim—

1. The herein-described method of uniting tubular bodies consisting in placing one of the bodies within the other and a plug of substantially constant volume and composed substantially of solid substances but susceptible of shearing deformation, within the inner body, then shortening the plug on one or more of its dimensions to cause it to expand on other dimensions, thereby forcing the inner body into contact with the outer body; substantially as described.

2. The herein-described method of uniting tubular bodies consisting in placing one of the bodies within the other and a disintegrable plug of substantially constant volume and composed substantially of solid substances but susceptible of shearing deformation, within the inner body, then shortening the plug on one or more of its dimensions to cause it to expand on other dimensions, thereby forcing the inner body into contact with the outer body and finally disintegrating and removing the plug; substantially as described.

3. The herein-described method of uniting tubular metallic bodies consisting in placing one of the bodies within the other and a plug of substantially constant volume but susceptible of shearing deformation within the inner body, then shortening the plug on one or more of its dimensions by pressure applied exteriorly of said bodies, thereby expanding the plug along other dimensions and forcing the inner body into contact with the outer body; substantially as described.

4. The herein-described method of uniting tubular bodies consisting in placing one of the bodies within the other and a plug of substantially constant volume, but susceptible of shearing deformation within the inner body, then deforming the plug by transverse pressure and simultaneously holding the same against expansion longitudinally of the tubular bodies whereby the two tubular bodies are forced into intimate contact with each other; substantially as described.

5. The herein-described method of uniting the ends of the tubular bodies consisting in placing a fusible solid plug susceptible of shearing deformation in the end of one of said tubular bodies, placing said tubular body within the end of the other, shortening the plug on one or more of its dimensions by thrusts mechanically applied, thereby expanding the inner body into contact with the other body and subsequently heating the bodies to melt out the plug; substantially as described.

6. A plug for use in forming tubular joints composed substantially of solid material having a substantially constant volume and susceptible of a shearing deformation; substantially as described.

7. A plug for use in forming tubular joints, composed of a deformable hollow casing, filled with fusible metal; substantially as described.

8. A plug for use in forming tubular joints, composed of such material as to be susceptible of shearing deformation, and having a casing of a material harder than that of which its central portion is formed; substantially as described.

9. A plug for use in forming tubular joints, composed of a material having a substantially constant volume but susceptible of shearing deformation and provided with means for hindering its expansion in directions in which expansion is undesirable; substantially as described.

10. A plug for use in forming tubular joints, composed of material having a substantially constant volume but susceptible of shearing deformation and provided with a tenacious transfixing-piece having enlargements to hinder its deformation in the directions in which expansion is undesirable; substantially as described.

11. A plug for use in forming tubular joints, composed of material having a substantially constant volume but susceptible of shearing deformation and having a tenacious transfixing-piece provided with terminal enlargements whereby its expansion will occur only in the desired direction; substantially as described.

12. The herein-described method of uniting tubular bodies consisting in placing one of the bodies within the other and a plug of substantially constant volume but susceptible of shearing deformation within the inner body and finally indenting the overlapping tubular bodies, thereby interlocking the tubular ends and deforming the plug by reducing it on some dimensions and causing it together with the inner tube to expand on other dimensions; substantially as described.

In testimony whereof I have hereto set my hand in the presence of the two subscribing witnesses.

CHARLES VANDELEUR BURTON.

Witnesses:
HAROLD WALE,
HARRY B. BRIDGES.